(12) United States Patent
Kimura et al.

(10) Patent No.: US 9,994,726 B2
(45) Date of Patent: Jun. 12, 2018

(54) LAMINATE, METHOD FOR PRODUCING SAME, AND GAS BARRIER MATERIAL

(71) Applicant: TOPPAN PRINTING CO., LTD., Tokyo (JP)

(72) Inventors: Mitsuharu Kimura, Tokyo (JP); Yumiko Oomori, Tokyo (JP); Nao Nishijima, Tokyo (JP); Kosuke Shimizu, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 73 days.

(21) Appl. No.: 14/218,089

(22) Filed: Mar. 18, 2014

(65) Prior Publication Data

US 2014/0199541 A1 Jul. 17, 2014

Related U.S. Application Data

(63) Continuation of application No. PCT/JP2012/073812, filed on Sep. 18, 2012.

(30) Foreign Application Priority Data

Sep. 22, 2011 (JP) .................... 2011-207973

(51) Int. Cl.
| | | |
|---|---|---|
| *B23B 23/04* | (2006.01) | |
| *C09D 101/02* | (2006.01) | |
| *B32B 23/04* | (2006.01) | |
| *C08J 7/04* | (2006.01) | |
| *D21H 27/30* | (2006.01) | |
| *D21H 11/20* | (2006.01) | |
| *D21H 19/34* | (2006.01) | |

(52) U.S. Cl.
CPC ............ *C09D 101/02* (2013.01); *B32B 23/04* (2013.01); *C08J 7/047* (2013.01); *D21H 11/20* (2013.01); *D21H 19/34* (2013.01); *D21H 27/30* (2013.01); *B32B 2255/10* (2013.01); *B32B 2255/12* (2013.01); *B32B 2307/7242* (2013.01); *C08J 2301/02* (2013.01); *C08J 2377/00* (2013.01); *C08J 2401/02* (2013.01); *Y10T 428/253* (2015.01); *Y10T 428/31739* (2015.04); *Y10T 428/31978* (2015.04); *Y10T 428/31982* (2015.04)

(58) Field of Classification Search
CPC ............ B32B 23/04; B32B 2307/7242; B32B 2255/10; B32B 2255/12; C09D 101/02; C08J 7/047; C08J 2301/02; C08J 2377/00; C08J 2401/02; D21H 27/30; D21H 11/20; D21H 19/34; Y10T 428/253; Y10T 428/31978; Y10T 428/31982; Y10T 428/31739

See application file for complete search history.

(56) References Cited

U.S. PATENT DOCUMENTS

| | | | | |
|---|---|---|---|---|
| 3,259,537 A | * | 7/1966 | Battista ............... | B05D 7/02 424/443 |
| 2007/0163217 A1 | * | 7/2007 | Frey ................... | B01D 39/1623 55/482 |
| 2011/0262731 A1 | * | 10/2011 | Mukai et al. ........... | 428/292.1 |
| 2012/0237575 A1 | * | 9/2012 | Yoshii ................. | A61K 9/2866 424/400 |
| 2013/0017400 A1 | | 1/2013 | Imai et al. | |

FOREIGN PATENT DOCUMENTS

| | | | |
|---|---|---|---|
| EP | 2 546 297 A1 | 1/2013 | |
| EP | 2 551 104 A1 | 1/2013 | |
| JP | 2009-69427 | 4/2009 | |
| JP | 2010-155363 | 7/2010 | |
| JP | 4998981 | 8/2012 | |
| WO | WO 2010/074341 A1 | 7/2010 | |
| WO | WO 2011065551 A1 * | 6/2011 | ........... A61K 9/2813 |
| WO | WO 2011/118520 A1 | 9/2011 | |

OTHER PUBLICATIONS

Polymers for Packaging and Containers in Food Industry. V. S. Yakovlev. Aug. 2008, 105-132.*
European Office Action dated Jul. 3, 2015 in corresponding European Patent Application No. 12833029.7.
International Search Report dated Dec. 18, 2012 in corresponding International Patent Application No. PCT/JP2012/073812.

* cited by examiner

*Primary Examiner* — Callie Shosho
*Assistant Examiner* — John D Freeman

(57) ABSTRACT

A laminate having high adhesion between a fine cellulose layer and a base material, a method for producing the same, and a gas barrier material. The laminate is such that a fine cellulose layer containing fine cellulose having a carboxyl group is laminated on the base material, and a mixed layer in which the fine cellulose is mixed in the base material is further interposed between the base material and the fine cellulose layer. This laminate can be produced by coating the base material with a dispersion containing fine cellulose having a carboxyl group, swelling the base material with the thus coated dispersion, and drying the swollen base material and the coated dispersion. The laminate may also be produced by providing a swollen base material, coating the swollen base material with a dispersion containing fine cellulose having a carboxyl group, and drying the base material and the coated dispersion.

6 Claims, No Drawings

LAMINATE, METHOD FOR PRODUCING SAME, AND GAS BARRIER MATERIAL

CROSS-REFERENCE TO RELATED APPLICATIONS

This application is a continuation of and claims the benefit of International Patent Application No. PCT/JP2012/073812, filed Sep. 18, 2012, and claims the benefit of Japanese Patent Application No. 2011-207973, filed Sep. 22, 2011, the disclosures of both of which are incorporated herein by reference.

TECHNICAL FIELD

This invention relates to a laminate and a method for producing same, and also to a gas barrier material.

BACKGROUND ART

Containers and packaging materials such as for foods, toiletry products, drugs, medical supplies, electronic components, etc., should have strength and gas barrier properties sufficient to protect the contents. Most of currently employed gas barrier materials are occupied by those prepared from chlorine-based materials such as polyvinylidene chloride and those prepared by evaporation of inorganic substances. Hence, enormous amounts of carbon dioxide and heat are discharged during the course of the preparation and disposal. Further, with the chlorine-based materials, a problem is involved in the generation of dioxins. As to the evaporated films of inorganic substances, there have arisen some problems such as of damaging incinerators upon burning and requiring removal of films for recycling. Therefore, conversion of these gas barrier materials to eco-friendly materials has been being in progress.

A noteworthy eco-friendly material is cellulose. Cellulose is contained in cell walls of plants, excocrine secretions from microbes, mantles of sea squirts, etc., and is the most common polysaccharide on earth. Cellulose has biodegradability, high crystallinity and excellent stability and safety. Therefore, the development of application to various fields has been expected.

Because of strong intramolecular hydrogen bonds and high crystallinity, cellulose is almost insoluble in water and ordinary solvents. Therefore, studies on the improvement of solubility have been made extensively. Cellulose has three hydroxyl groups. When an oxidation reaction with a TEMPO catalyst system is performed, only the primary hydroxyl group at the C6 position of cellulose can be selectively oxidized and converted to a carboxyl group through an aldehyde group. Additionally, the reaction is feasible under mild conditions such as of an aqueous system or room temperature, for which much attention has been paid to cellulose recently. It will be noted that TEMPO is an abbreviation of 2,2,6,6-tetramethylpiperidine-1-oxyl.

It is known that TEMPO oxidation of natural cellulose enables only the nano-order crystal surface to be oxidized while keeping the crystallinity of cellulose and that mere addition of a slight mechanical treatment enables fine cellulose to be dispersed in water. It is also known that fine cellulose has high strength due to its high crystallinity and low linear expansion coefficient and that a film formed by drying the water-dispersed fine cellulose is gas impermeable.

PTL 1 has set forth a gas barrier laminate wherein a cellulose fiber layer containing fine cellulose fibers is stacked on a surface of a base material. In this gas barrier laminate, a suspension containing fine cellulose fibers is fed and attached to the surface of the base material thereby forming the cellulose fiber layer.

PRIOR-ART LITERATURE

Patent Literature

[PTL1] Japanese Patent Application Publication NO. 2010-155363

SUMMARY OF THE INVENTION

Problems to be Solved by the Invention

However, mere coating of the base material with the suspension containing fine cellulose fibers has concern that adhesion between the cellulose fiber layer and the base material is so weak as to cause easy peeling. If a surface treatment or anchor-coating is carried out so as to compensate for the adhesion, the process correspondingly increases in number, with the possibility of increasing costs.

The invention has been made in view of those circumstances and has as its object the provision of a laminate which is high in adhesion between a fine cellulose layer and a base material and is thus unlikely to delaminate and a method for producing same, and also a gas barrier material.

Measure for Solving the Problems

In order to solve the foregoing problems, embodiments of the invention are configured as follows. That is, a laminate according to one embodiment of the invention is characterized by comprising a fine cellulose layer containing fine cellulose having a carboxyl group stacked on one or both surfaces of a base material, and a mixed layer of the fine cellulose in the base material disposed between the base material and the fine cellulose layer.

In this laminate, it is preferred that the base material is cellophane, paper, nylons or a derivative thereof, or composite materials of two or more thereof.

Preferably, the fine cellulose is such that carboxyl groups are introduced on the crystalline surface by an oxidation reaction using an N-oxyl compound and the amount of the carboxyl groups of the fine cellulose is at not less than 0.1 mmol/g to not larger than 3.0 mmol/g.

It is also preferred that a number average fiber width of the fine cellulose is from not less than 1 nm to not larger than 50 nm, and a number average fiber length is from not less than 100 to not larger than 10000 times the number average fiber width.

It is preferred that the layer containing the fine cellulose further contains an inorganic layered mineral.

A gas barrier material according to another embodiment of the invention is characterized by comprising the laminate set out above.

A method for producing a laminate according to another embodiment of the invention is characterized by comprising the steps of coating one or both surfaces of a base material with a dispersion containing fine cellulose having a carboxyl group, swelling the base material with the thus coated dispersion, and drying the swollen base material and the coated dispersion.

A method for producing a laminate according to a further embodiment of the invention is characterized by comprising the steps of coating one or both surfaces of a base material in a wet state with a dispersion containing fine cellulose having a carboxyl group, and drying the base material and the thus coated dispersion.

In this preparation method of the laminate, it is preferred that the percentage of water content of the base material in the wet state is at 10 mass %-99 mass %.

Effects of the Invention

The laminate according to the invention has, between a base material and a fine cellulose layer, a mixed layer wherein the fine cellulose is mixed in the base material, under which the structure between the base material and the fine cellulose becomes denser. Thus, the adhesion between the base material and the fine cellulose layer is high, resulting in the unlikelihood of peeling.

Further, according to a method for producing a laminate of the invention, when coating a base material with a dispersion containing fine cellulose to swell the base material, or when using a base material in wet state as a base material to be coated with a dispersion containing fine cellulose, a mixed layer wherein the fine cellulose is mixed in the base material can be provided between the base material and a fine cellulose layer. Accordingly, a laminate having strong adhesion of the base material and the fine cellulose layer can be easily produced at low costs.

MODE FOR CARRYING OUT THE INVENTION

Embodiments of a laminate and its producing method, and a gas barrier material according to the invention will now be described in detail.

The laminate according to the present embodiment has, on one or both surface of a base material, a fine cellulose layer laminated and containing fine cellulose having a carboxyl group, and a mixed layer of the fine cellulose in the base material, which is interposed between the base material and the fine cellulose layer.

In the mixed layer, the structure between the base material and the fine cellulose becomes denser and thus, high adhesion between the base material and the fine cellulose layer results owing to the presence of the mixed layer. Accordingly, delamination between the base material and the fine cellulose layer is less likely to occur.

The mixed layer has excellent barrier properties owing to its denser structure between the base material and the fine cellulose. Accordingly, the laminate of the embodiment has excellent barrier properties against molecules of flavors and smells etc., and gases such as oxygen and water vapor, and can be used as a gas barrier material.

The fine cellulose of high strength mixed in the base material can contribute to improve physical strength (tension, tearing, piercing, etc.) of the base material. Further, because the surface of the laminate is smooth owing to the presence of the hydrophilic fine cellulose layer, printing characteristics for aqueous inks are excellent.

Such a laminate of the present embodiment can be produced by the following method. At first, one or both of the surfaces of a base material is coated with a dispersion containing fine cellulose having a carboxyl group (coating step), and the base material is swollen with the thus coated dispersion (swelling step). Next, the swollen base material and the coated dispersion are dried (drying step) to obtain a laminate.

Alternatively, the laminate may be produced by another method described below. At first, the base material in wet state is provided and is coated with a dispersion containing fine cellulose having a carboxyl group on one or both surfaces of the base material in wet state (coating step). Subsequently, the base material and the thus coated dispersion are dried (drying step) to obtain a laminate.

When producing the laminate by these methods, there can be provided the mixed layer of the fine cellulose in the base material between the base material and the fine cellulose layer either by swelling the base material with the coated dispersion or by coating the dispersion onto the base material in wet state.

Since the adhesion between the base material and the fine cellulose layer can be improved by the presence of the mixed layer without resorting to other processes such as of surface treatment and anchor coating, the laminate can be produced easily at low cost.

In addition, according to the above-described other method, because the wet base material and the coated dispersion are dried at the same time, the drying step can be more simplified when comparing to drying separately.

The embodiments of the laminate and its production method, and the gas barrier material according to the invention are now described in more detail.

(As to the Base Material of the Laminate)

The base material in the laminate of the invention is one which is capable of being swollen with water containing fine cellulose, organic solvents (e.g. an alcohol), or mixed solvents thereof. Examples include polyesters (polyethylene terephthalate, polyethylene naphthalate, polylactic acid, etc.), polyolefins (polyethylene, polypropylene, etc.), celluloses (cellulose, triacetylcellulose, etc.), polyamides (nylons, etc.), acrylic resins (polyacrylonitrile, etc.), polystyrenes, polyimides, polycarbonates, polyvinyl chlorides, polyurethanes, polyvinyl alcohols, paper, or derivatives thereof. Additionally, composite materials of two or more mentioned above may also be used. Among them, cellophane, paper and nylons are preferred, and cellophane and paper are more preferred for their environment friendliness.

The shape of the base material is not specifically limited. When used as a sheet or film, its thickness may be at not less than 10 μm to not larger than 1000 μm. The base material may be in the wet state containing water or an organic solvent, and the percentage of water content (the percentage of solvent content) therein is preferably at 10-99 mass %, more preferably at 30-90 mass %. Especially, paper may be one that is in the state of wet sheet after paper making. As to cellophane, it may be in any state so far as a wet state in the course of from after regeneration in the production step to drying is ensured.

(As to the Fine Cellulose Layer of Laminate and its Preparation Method)

The amount of carboxyl groups of the fine cellulose in the invention is preferably from not less than 0.1 mmol/g to not larger than 3.0 mmol/g, more preferably from not less than 0.5 mmol/g to not larger than 2.0 mmol/g. If the amount of the carboxyl groups is less than 0.1 mmol/g, there is concern that no electrostatic repulsion occurs and thus, a difficulty is involved in uniformly dispersing the fine cellulose. Over 3.0 mmol/g, there is also concern that the crystallinity of fine cellulose lowers.

It is preferred that the fine cellulose of the invention has the number average fiber width ranging from 1 nm to 50 nm and the number average fiber length ranging from 100 to 10000 times the number average fiber width. If the number average fiber width is less than 1 nm, the cellulose is not broken into nanofibers. Over 50 nm, the transparency of the dispersion is impaired. If the number average fiber length is less than 100 times the number average fiber width, there is concern that the strength of the cellulose layer lowers. Over 10000 times the number average fiber width, the viscosity of the dispersion becomes too high, with concern that a problem arises in coatability.

Next, a method for producing the fine cellulose layer is described. The fine cellulose layer is obtained by the steps of oxidizing cellulose, reducing the cellulose into fine pieces to obtain a coating dispersion, and coating it onto a base material.

(As to the Cellulose Oxidizing Step)

As a starting material of cellulose to be oxidized, there can be used wood pulp, non-wood pulp, recycled waste pulp, cotton, bacterial cellulose, valonia cellulose, ascidian cellulose, fine cellulose, microcrystal cellulose, etc.

For the modification of cellulose, it is preferred to use a technique wherein a co-oxidant is used in the presence of an N-oxyl compound which has high selectivity to the oxidation of primary hydroxyl group while keeping the structure to the possible extent under aqueous, relatively mild conditions. As the N-oxyl compound, mention is made, aside from 2,2,6,6-tetramethylpiperidine-N-oxyl (TEMPO), 2,2,6,6-tetramethyl-4-hydroxypiperidine-1-oxyl, 2,2,6,6-tetramethyl-4-phenoxypiperidine-1-oxyl, 2,2,6,6-tetramethyl-4-benzylpiperidine-1-oxyl, 2,2,6,6-tetramethyl-4-acryloyloxypiperidine-1-oxyl, 2,2,6,6-tetramethyl-4-methacryloyloxypiperidine-1-oxyl, 2,2,6,6-tetramethyl-4-benzoyloxypiperidine-1-oxyl, 2,2,6,6-tetramethyl-4-cinnamoyloxypiperidine-1-oxyl, 2,2,6,6-tetramethyl-4-acetylaminopiperidine-1-oxyl, 2,2,6,6-tetramethyl-4-acryloylaminopiperidine-1-oxyl, 2,2,6,6-tetramethyl-4-methacryloylaminopiperidine-1-oxyl, 2,2,6,6-tetramethyl-4-benzoylaminopiperidine-1-oxyl, 2,2,6,6-tetramethyl-4-cinnamoylaminopiperidine-1-oxyl, 4-propionyloxy-2,2,6,6-tetramethylpiperidine-N-oxyl, 4-methoxy-2,2,6,6-tetramethylpiperidine-N-oxyl, 4-ethoxy-2,2,6,6-tetramethylpiperidine-N-oxyl, 4-acetamido-2,2,6,6-tetramethylpiperidine-N-oxyl, 4-oxo-2,2,6,6-tetramethylpiperidine-N-oxyl, 2,2,4,4-tetramethylazetidine-1-oxyl, 2,2-dimethyl-4,4-dipropylazetidine-1-oxyl, 2,2,5,5-tetramethylpyrrolidine-N-oxyl, 2,2,5,5-tetramethyl-3-oxopyrrolidine-1-oxyl, 2,2,6,6-tetramethyl-4-acetoxypiperidine-1-oxyl, di tert-butylamine-N-oxyl, and, poly[(6-[1,1,3,3-tetramethylbutyl]amino)-s-triazine-2,4-diyl][(2,2,6,6-tetramethyl-4-piperidyl)imino]hexamethylene [(2,2,6,6-tetramethyl-4-piperidyl)imino. Of these, 2,2,6,6-tetramethyl-1-piperidine-N-oxyl and the like are preferably used.

As the above-mentioned co-oxidant, any co-oxidants such as halogens, hypohalous acid, halous acid, perhalous acid, salts thereof, halogen oxides, nitrogen oxides and peroxides may be used so far as they are able to promote oxidation reaction. Of these, sodium hypochlorite is preferred in view of the ease in availability and reactivity.

When carried out in co-existence of a bromide or iodide, the oxidation reaction can be advanced smoothly. Thus, the introduction efficiency of carboxyl group can be improved.

As an N-oxyl compound, TEMPO is preferred and its amount may be one enough to function as a catalyst. As a bromide, sodium bromide or lithium bromide is preferred, of which sodium bromide is more preferred in view of cost and stability. The amount of the co-oxidant, bromide or iodide may be one capable of promoting the oxidation reaction.

It is preferred that the reaction is performed under conditions of a pH of 9-11. As the oxidation proceeds, carboxyl groups are formed to lower the pH in the system, for which it is necessary to keep the system at a pH of 9-11.

To keep the system alkaline, adjustment can be made such that an alkali aqueous solution is added while keeping the pH constant. For the alkali aqueous solution, there is used sodium hydroxide, lithium hydroxide, potassium hydroxide or ammonia aqueous solution, or an organic alkali such as tetramethylammonium hydroxide, tetraethylammonium hydroxide, tetrabutylammonium hydroxide or benzyltrimethylammonium hydroxide. Sodium hydroxide is preferred in view of cost, etc.

In order to terminate the oxidation reaction, it is necessary that the reaction of the co-oxidant is fully finished by addition of other type of alcohol while keeping the pH of the system. As an alcohol to be added, low-molecular-weight alcohols such as methanol, ethanol and propanol are preferred in order to complete the reaction immediately. Ethanol is more preferable in view of the safety of by-products formed by the reaction, etc.

As a method of washing the oxidized cellulose after completion of the reaction, mention is made of a method of washing while leaving a salt formed with an alkali as it is, a method of washing after addition of an acid for conversion into carboxylated form, a method of washing after addition of an organic solvent for insolubilization. It is preferred from the standpoint of handleability, yield and the like to use the method of washing after addition of an organic solvent for insolubilization. As a washing solvent, water is preferred.

(As to the Step of Reducing Cellulose into Pieces to Make a Coating Dispersion)

For a method of reducing oxidized cellulose into pieces, the oxidized cellulose is initially suspended in water, various types of organic solvents such as an alcohol, or mixed solvents thereof. If needed, the dispersion may be adjusted in pH so as to enhance dispersability. For an alkali aqueous solution used for the pH adjustment, mention is made of sodium hydroxide, lithium hydroxide, potassium hydroxide, an ammonia aqueous solution, and organic alkalis such as tetramethylammonium hydroxide, tetraethylammonium hydroxide, tetrabutylammonium hydroxide and benzyltrimethylammonium hydroxide. Of these, sodium hydroxide is preferred in view of cost and the ease in availability, etc.

Subsequently, for physical defibration, the fine pieces can be obtained by those methods using a high-pressure homogenizer, a ultrahigh-pressure homogenizer, a ball mill, a roll mill, a cutter mill, a planetary mill, a jet mill, an attritor, a grinder, a juicer-mixer, a homomixer, a ultrasonic homogenizer, a nanogenizer, an aqueous counter collision, etc. By performing the defibration process over an arbitrary time or by an arbitrary number of repetitions, a dispersion aqueous solution of modified fine cellulose having a carboxyl group on its surfaces can be obtained.

The dispersion of fine cellulose may, as necessary, contains components other than cellulose and the component used for the pH adjustment within ranges not impairing the effect of the invention. Other types of components are not limited specifically and can be appropriately selected from known additives depending on the usage of the fine cellulose layer and the like. Specifically, mention is made of organometallic compounds such as alkoxysilanes or hydrolysates thereof, inorganic layered compounds, inorganic acicular minerals, leveling agents, antifoaming agents, water-soluble polymers, synthetic polymers, inorganic particles, organic particles, lubricants, antistats, ultraviolet absorbers, dyes, pigments, stabilizers, magnetic powders, orientation accelerators, plasticizers, and cross-linkers, etc. Among them, inorganic layered compounds are preferred as serving to promote the planar orientation of film (the fine cellulose layer) and improve water resistance, humidity resistance, gas barrier properties, etc.

The inorganic layered compound is a crystalline inorganic compound having a layered structure. As long as inorganic layered compounds are used, their type, particle size, aspect-ratio and so on are not limited specifically, proper choice is possible depending on the purpose in use and the like. As an inorganic layered compound, specific examples include clay minerals, typical of which are a kaolinite group, smectite group, mica group, etc. As a smectite group of inorganic layered compounds selected among them, mention is made of montmorillonite, hectorite, saponite, etc. Of these, montmorillonite is preferred in view of dispersion stability in composition and coatability of composition, etc.

The inorganic layered compound may be dispersed directly in an aqueous dispersion, or may be formulated after preliminary dispersion in an aqueous medium such as water.

It is preferred that inorganic layered minerals are added within a range of 10-50 mass % relative to the fine cellulose.
(As to the Step of Coating with Fine Cellulose for Lamination)

In the method of coating the base material or the wet base material with the cellulose dispersion of the invention, there can be used a comma coater, a roll coater, a reverse roll coater, a direct gravure coater, a reverse gravure coater, an offset gravure coater, a roll kiss coater, a reverse kiss coater, a micro gravure coater, an air doctor coater, a knife coater, a bar coater, a wire bar coater, a die coater, a dip coater, a blade coater, a brush coater, a curtain coater, a die slot coater etc., or a combination of two or more thereof. The coating method may be either of a batch type or of continuous type.

Especially, with the case of coating onto a wet base material, coating is feasible by any one of the above-described coating methods prior to the drying step in the preparation process of individual base materials.

For improving various properties, a thin film layer consisting of a metal and metallic oxide, an anchor/primer layer, an antifouling layer, a print layer, an antistatic layer and so on may be interposed between any layers of laminate. The type of each layer is not limited specifically. If used as a laminate or gas barrier material according to the invention, the type of metal or metal oxide preferably includes aluminum, aluminum oxide, silica oxide, etc.

In the invention, a resin layer or sealant layer may be provided as the outermost layer of the laminate. Although the resin layer or sealant layer is not limited specifically, mention is made, for example, of a polypropylene film such as an unstretched polypropylene film, or a polyethylene film such as a low-density polyethylene film, a linear low-density polyethylene film or the like. Thermoplastic resins are usually stacked through an adhesive layer.

With the laminate of the invention, the mixed layer is formed by coating a swollen base material with a fine cellulose dispersion, followed by drying them simultaneously. The thickness of the mixed layer is preferably at 10 nm-5 μm although varied according to the degree of swelling of the base material, a standing time after coating of the fine cellulose dispersion onto the base material, and so on. Because of the presence of the mixed layer, the molecules constituting the base material and the fine cellulose are mutually entangled and remain more densely. Hence, adhesion at the interface between the base material and the fine cellulose layer is improved and barrier properties are correspondingly improved.

The inside of the fine cellulose is kept high in crystallinity without receiving a damage as would be caused by mild, selective mild and selective TEMPO oxidation reaction and has a length of several hundreds of nanometers to several micrometers, thus permitting entanglement with the base material at the mixed layer. Therefore, tensile, tearing, piercing and the like physical strengths are improved. Since the surface of the laminate has the fine cellulose layer having number of carboxyl groups, so that reaction or bonding with compounds contained in an ink or adhesive is possible. In addition, smoothness is improved thereby leading to improved adaptability for adhesives or inks in subsequent steps. With hydrophilic inks or adhesives, the adaptability is more improved.

It will be noted that the laminate of the invention can be used, aside from as various films and sheets, as various types of molding containers such as bottles, cylinders and boxes. The laminate is also suitable for packaging materials.

EXAMPLES

The invention is described in detail on the basis of examples. The technical range of the invention should not be construed as limited to these embodiments.
<TEMPO Oxidation of Cellulose>

30 g of soft wood bleached kraft pulp was suspended in 1800 g of distilled water, followed by adding a solution dissolving 0.3 g of TEMPO and 3 g of sodium bromide in 200 g of distilled water and cooling to 20° C. 172 g of an aqueous solution of sodium hypochlorite having a concentration of 2 mol/l and a density of 1.15 g/ml was added drop by drop to commence oxidation reaction. The system was invariably kept at a temperature of 20° C. and was continuedly maintained at pH 10 against the lowering of pH during the reaction by addition of an aqueous solution of sodium hydroxide having a concentration of 0.5 mol/l. When sodium hydroxide reached 2.85 mmol/g relative to the weight of cellulose, enough ethanol was added so as to stop the reaction. Subsequently, hydrochloric acid was added until the pH arrived at 1, followed by washing well with distilled water repeatedly to obtain oxidized pulp.
Measurement of Carboxyl Groups in the Oxidized Pulp 0.1 g, on solid weight basis, of the oxidized pulp and the reoxidized pulp, both obtained by the TEMPO oxidization, was taken and dispersed in water at a concentration of 1%, followed by adding hydrochloric acid to make a pH of 3. Thereafter, the amount of the carboxyl groups (mmol/g) was measured by a conductometric titration method by use of 0.5 mol/l of a sodium hydroxide aqueous solution. The results were found to be at 1.6 mmol/g.

Reducing Oxidized Pulp into Fine Pieces

Preparatory Example 1

1 g of the oxidized pulp obtained by the above-described TEMPO oxidation was dispersed in 99 g of distilled water, followed by adjustment of pH to 10 by using a sodium hydroxide aqueous solution. The prepared dispersion was subjected to treatment for reducing into fine pieces by means of a juicer-mixer for 60 minutes to obtain a 1 wt % aqueous dispersion of fine cellulose.

Preparatory Example 2

A montmorillonite aqueous dispersion having a concentration of 1 wt %, as an inorganic compound, was mixed with the 1% fine cellulose aqueous dispersion prepared in the above-described Preparatory Example 1 in equal amounts, followed by dispersion treatment with use of an ultrasonic homogenizer.

Shape Observation

The shape of the above fine cellulose was observed through atomic force microscopy (AFM). A 1000-fold dilution of the 1% aqueous fine cellulose dispersion was cast and dried on a cleavage plane of mica, followed by observation with tapping AFM. Ten fiber heights were measured and averaged to provide a number average fiber width. As to the fiber length, similar observation with tapping AFM was made to measure ten fiber lengths along its major length and an average thereof was taken as a number average fiber length. The number average fiber width was at 3.5 nm and the number average fiber length was at 1.3 µm.

Examples 1 and 2

Cellophane (thickness: 25 µm) was used as a base material, and the aqueous dispersion prepared in the foregoing Preparatory Example 1 or 2 was coated using a bar coater such that a dry film thickness was at 1 µm, followed by allowing to stand until the cellophane was swollen and drying well to obtain laminates of Examples 1 and 2 having the mixed layer of the cellophane and fine cellulose and the fine cellulose layer.

Examples 3 and 4

Using stretched nylon film ONY (thickness: 25 µm) as a base material, the aqueous dispersion prepared in the above Preparatory Example 1 or 2 was coated using a bar coater in a dry film thickness of 1 µm, followed by allowing to stand until the film ONY was swollen. Thereafter, full drying resulted in the preparation of laminates of Examples 3 and 4 having the mixed layer of the ONY and fine cellulose and the fine cellulose layer.

Examples 5 and 6

Using paper (thickness: 25 µm) as a base material, the aqueous dispersion prepared in the above Preparatory Example 1 or 2 was coated using a bar coater in a dry film thickness of 1 µm, followed by allowing to stand until the paper was swollen. Thereafter, full drying resulted in the preparation of laminates of Examples 5 and 6 having the mixed layer of the paper and fine cellulose layer and the fine cellulose layer.

Examples 7 to 8

Using gel cellophane (dry thickness: 25 µm), the aqueous dispersion prepared in the above Preparatory Example 1 or 2 was coated using a bar coater such in a dry film thickness of 1 µm. Thereafter, immediate and full drying enabled the preparation of laminates of Examples 7 and 8 having the mixed layer of the cellophane and fine cellulose layer and the fine cellulose layer.

Examples 9 and 10

Using gel nylon (dry thickness: 25 µm) as a base material, the aqueous dispersion prepared in the above Preparatory Example 1 or 2 was coated using a bar coater in a dry film thickness of 1 µm. Thereafter, immediate and full drying resulted in the preparation of laminates of Examples 9 and 10 having the mixed layer of the nylon and fine cellulose layer and the fine cellulose layer.

Examples 11 and 12

Using a wet sheet (dry thickness: 25 µm) after paper making as a base material, the aqueous dispersion prepared in the above Preparatory Example 1 or 2 was coated using a bar coater in a dry film thickness of 1 µm. Thereafter, immediate and full drying resulted in the preparation of laminates of Examples 11 and 12 having the mixed layer of the paper and fine cellulose and the fine cellulose layer.

Comparative Example 1

Using polyethylene terephthalate (thickness: 25 µm) as a base material, the aqueous dispersion prepared in the above Preparatory Example 1 was coated using a bar coater in a dry film thickness of 1 µm. Thereafter, immediate and full drying resulted in the preparation of a laminate of Comparative Example 1, which had the fine cellulose layer in a dry thickness of 1 µm.

Comparative Example 2

Using a stretched polypropylene film (thickness: 25 µm) as a base material, the aqueous dispersion prepared in the above Preparatory Example 1 was coated using a bar coater in a dry thickness of 1 µm. Thereafter, immediate and full drying resulted in the preparation of a laminate of Comparative Example 2, which had the fine cellulose layer in a dry thickness of 1 µm.

Measurement of Oxygen Transmittance

Using an oxygen transmittance measuring device (MOCON OX-TRAN 2/21 produced by Modern Controls Inc.), the laminates prepared in the above Examples 1-12 and Comparative Examples 1, 2 were subjected to measurement of oxygen transmittance ($cm^3/m^2$-day) in an atmosphere having a temperature of 30° C. and a relative humidity of 40% RH. Table 1 shows the results.

Evaluation of Adhesion

The laminates prepared in Examples 1-12 and Comparative Examples 1, 2 were each bonded to a 70 µm thick unstretched polypropylene film by a dry-lamination process using a urethane polyol adhesive. The resulting laminate was cut into a strip having a width of 15 mm and a length of 100 mm, followed by measuring adhesion strength by a T-peel test at a peeling rate of 300 mm/min. The results are shown in Table 1.

TABLE 1

| | Oxygen transmittance $cm^3/m^2$-day 30° C.-40% RH | Adhesion strength N |
|---|---|---|
| Example 1 | 2.2 | 2.2 |
| Example 2 | 0.2 | 1.6 |
| Example 3 | 2.6 | 2 |
| Example 4 | 0.3 | 1.4 |
| Example 5 | 3.1 | 2.7 |
| Example 6 | 0.8 | 2.1 |
| Example 7 | 1.8 | 2.5 |
| Example 8 | 0.1 | 1.9 |
| Example 9 | 2 | 2.1 |
| Example 10 | 0.2 | 1.6 |
| Example 11 | 2.9 | 3.1 |
| Example 12 | 0.4 | 2.4 |
| Comparative Example 1 | 4.5 | 0.8 |

TABLE 1-continued

| | Oxygen transmittance cm³/m²-day 30° C.-40% RH | Adhesion strength N |
|---|---|---|
| Comparative Example 2 | 4.2 | 0.3 |

As will be apparent from the results of Table 1, when the mixed layer of the fine cellulose in the base material is provided between the base material and the fine cellulose layer containing fine cellulose having a carboxyl group, a dense structure at the interface between the base material and the fine cellulose layer can be made, thus making it possible to improve gas barrier properties and adhesion.

The invention claimed is:

1. A method for producing a laminate, comprising:
coating a dispersion containing fine cellulose having a carboxyl group onto one or both surfaces of a base material;
swelling the base material with the coating dispersion; and
drying the swollen base material and the coated dispersion,
such that a mixed layer in which the fine cellulose is mixed in the base material is formed between the swollen base material and the coated dispersion, wherein a degree of the swelling is set to provide a thickness of the mixed layer within a range of 10 nm-5 µm.

2. A method for producing a laminate, comprising:
providing a base material in a wet state;
coating a dispersion containing fine cellulose having a carboxyl group onto one or both surfaces of the base material in a wet state;
drying the base material and the thus coated dispersion; and by the coating and the drying, forming a mixed layer, in which the fine cellulose is mixed in the base material, between the base material and the fine cellulose layer, the mixed layer having a thickness in a range of 10 nm-5 µm.

3. The method for producing a laminate according to claim 2, wherein the percentage of water content of the base material in wet state is at 10 mass %-99 mass %.

4. The method for producing a laminate according to claim 2, wherein the base material in wet state is a swollen base material.

5. The method for producing a laminate according to claim 2, wherein the base material in wet state is gel cellophane or gel nylon.

6. The method for producing a laminate according to claim 2, wherein the base material in a wet state is a gel cellophane, a gel nylon or a paper in a state of a wet sheet after paper making.

* * * * *